Aug. 14, 1962 C. J. GAMBARDELLA 3,049,159
WHEEL SUPPORT AND LOCK FOR TIRE DEMOUNTING APPARATUS
Filed Dec. 10, 1959
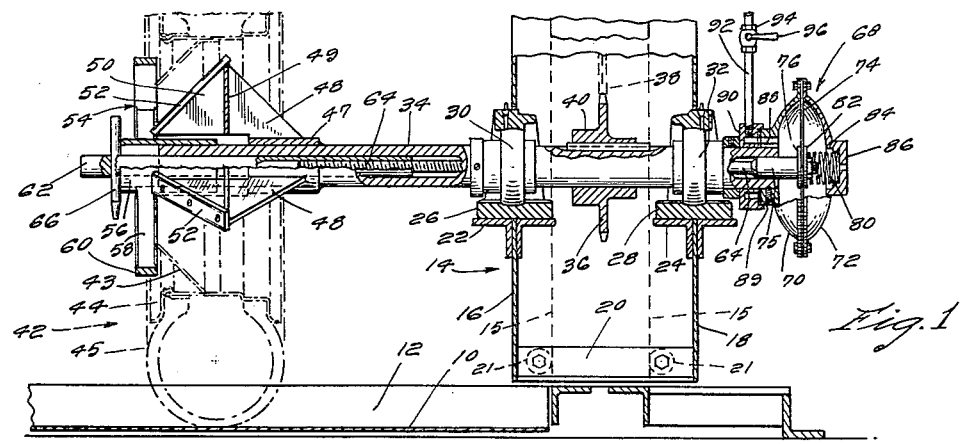
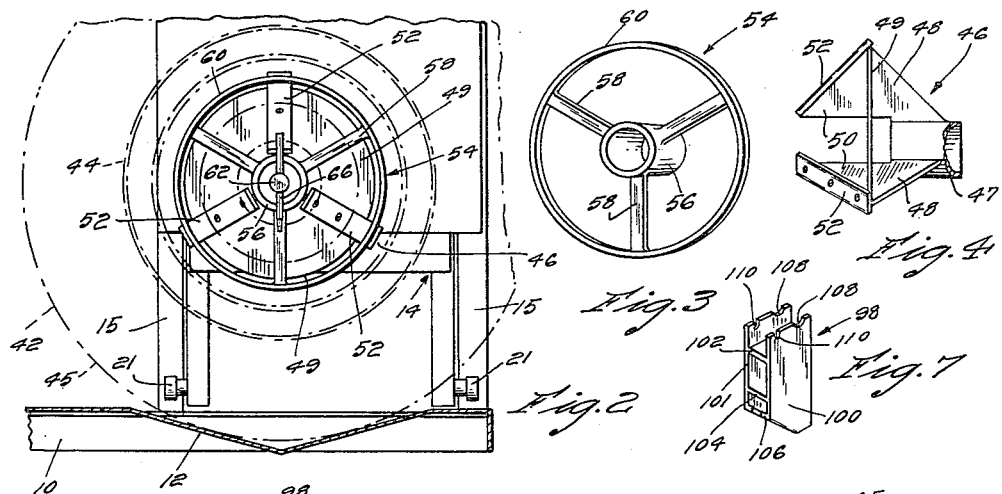
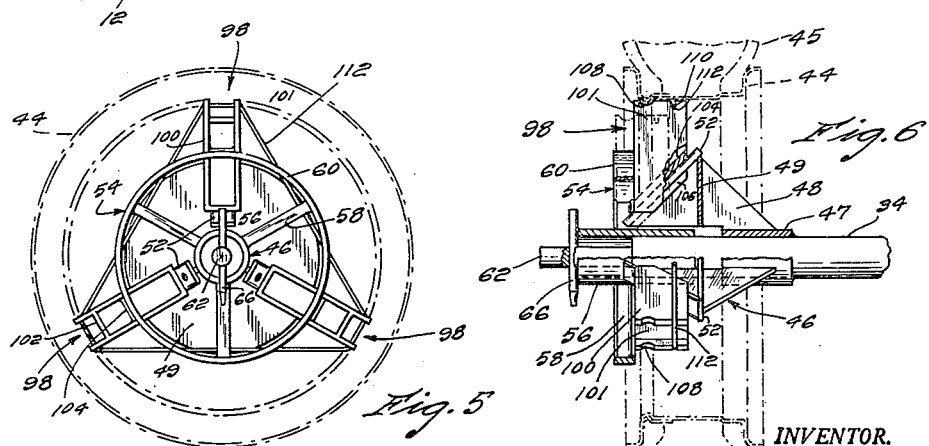
INVENTOR.
Carmine J. Gambardella
BY
Salter + Michaelson
Attorney.

United States Patent Office 3,049,159
Patented Aug. 14, 1962

3,049,159
WHEEL SUPPORT AND LOCK FOR TIRE
DEMOUNTING APPARATUS
Carmine J. Gambardella, Warwick, R.I., assignor to Lee Engineering Company, Pawtucket, R.I., a corporation of Rhode Island
Filed Dec. 10, 1959, Ser. No. 858,761
3 Claims. (Cl. 144—288)

The present invention relates to tire demounting apparatus. More particularly, the present invention relates to apparatus for securing a wheel assembly in position for the demounting of a tire therefrom. In copending application Serial No. 825,724 entitled Tire Demounting Apparatus and filed July 8, 1959, a power operated assembly is illustrated and described that is utilized to rotatably mount a wheel assembly in position for the demounting of a tire therefrom. The tire demounting apparatus described in the copending application is generally employed in the demounting of tires used on large vehicular equipment, these tires being particularly difficult to remove from their rims by conventional equipment known heretofore. In the tire demounting apparatus described in the copending application, a stepped wheel cone is utilized for receiving the large vehicular wheels thereon. Since the steps on the wheel cone limit the number of tires that the equipment can accommodate, the equipment accordingly is restricted for use with only certain size wheel assemblies. The present invention is designed to eliminate the restrictions of use because of variations in the size of the wheel assembly and includes a wheel receiving member that is so formed that it may accommodate any size wheel assembly within a predetermined range.

In the equipment described in the copending application, the wheel assemblies were normally positioned in the demounting position by a locking structure that was manually tightened. Although it is possible to physically secure the locking member against the wheel assembly to properly secure the wheel assembly in the demounting position thereof, it has been found that in the demounting operation the wheel assembly tends to loosen from the locking member and occasionally has to be retightened. The present invention overcomes these heretofore known difficulties in securing or fastening the wheel assembly on the wheel receiving member by providing a pressure actuated locking device that is adapted to move a locking member into firm engagement with the wheel assembly. Thus, by forcing the locking member into engagement with the wheel assembly by the actuation of the pressure responsive device, the wheel assembly is always securely locked on the wheel receiving member during the tire demounting operation. Accordingly, it is an object of the present invention to provide tire demounting apparatus that includes means for locking the wheel assembly in the tire demounting position thereof.

Another object of the present invention is to provide a pressure actuated device for locking a wheel assembly in the tire demounting position thereof.

Still another object of the present invention is to provide a wheel locking construction for locking a wheel assembly in the tire demounting position that includes a pressure responsive device for moving an actuating rod axially to cause said locking device to lock the wheel assembly in the tire demounting position.

Still another object is to provide a wheel receiving member for use in tire demounting apparatus that is adapted to receive various diameter wheel assemblies thereon.

Still another object is to provide tire demounting apparatus that includes a locking member for engaging a wheel assembly, the locking member being adapted to be moved into engagement with the wheel assembly by the axial movement of a spindle that extends through a tubular drive or power shaft and that is operatively connected to a pressure responsive device.

Still another object is to provide a plurality of adapter elements that are adapted to be positioned on the wheel retaining member thereby enabling the apparatus to accommodate the disc-less type of wheel assemblies.

Other objects, advantages and features of my invention will become obvious as the description thereof proceeds when considered in connection with the accompanying drawings.

In the drawings which illustrate the best mode presently contemplated by me for carrying out my invention:

FIG. 1 is a side elevational view of the apparatus embodied in the present invention with parts shown in section;

FIG. 2 is a front elevational view of the apparatus illustrated in FIG. 1;

FIG. 3 is a perspective view of the locking member that is adapted to lock the wheel assembly in the tire demounting position thereof;

FIG. 4 is a side elevational view of the wheel receiving member that is adapted to receive the wheel assembly in the tire demounting position thereof;

FIG. 5 is a front elevational view showing the use of adapter elements that are mounted on the wheel receiving member when a disc-less type of wheel assembly is adapted to be utilized in connection with the apparatus described herein;

FIG. 6 is a side elevational view of the modification illustrated in FIG. 5 with parts shown in section; and FIG. 7 is a perspective view of one of the adapter elements that is adapted to be mounted on the wheel receiving member shown in FIG. 4.

In the application of the invention for the demounting of tires from a wheel assembly, the form of the invention illustrated in FIGS. 1 through 4 is adapted for use with those wheel assemblies which include a central disc portion in addition to the tire and rim. The disc portion is generally formed with a central opening for receiving the axle on which the wheel assembly is mounted. As will be described hereinafter, the invention may also be adapted for use in demounting tires from wheel assemblies wherein the central disc portion is eliminated.

Referring now to the drawings and particularly to FIG. 1, the tire demounting apparatus embodied in the present invention is illustrated therein and includes a frame structure that is generally of the construction illustrated and described in copending application Serial No. 825,724. As shown in FIG. 1, a base 10 is provided, a portion of which is illustrated, a V-shaped centering platform 12 being mounted on the base 10 for receiving a wheel assembly. A power frame assembly generally indicated at 14 and a portion of which is shown in FIG. 1 is adapted to be mounted for vertical movement on a lift frame, the lift frame including side members 15 (FIG. 2). The power frame assembly 14 carries the structure for rotating the wheel assembly, and comprises a vertically disposed rectangularly shaped frame that includes spaced vertical struts 16 and 18 which are joined by a lower horizontal support bracket 20 and an upper horizontal support bracket (not shown). In order to facilitate lifting movement of the power frame assembly, rollers 21 are provided and are secured to the support brackets 20 for engagement with suitable tracks formed on the side members 15 of the lift frame. Bearing supports 22 and 24 are secured to the vertical struts 16, 18, and are adapted to support bearing blocks 26 and 28, respectively. Self-aligning bearing assemblies 30 and 32 are mounted in the bearing blocks 26 and 28, and are adapted to prevent deflection of a tubular power shaft 34 that extends therethrough in bearing relation therewith, the tubular power shaft 34 always being free for rotation within the bearings 30 and 32.

In order to rotate the tubular power shaft 34, a drive mechanism is operatively connected thereto and is mounted in the power frame assembly 14. The drive components of the drive assembly are illustrated and described in the aforesaid copending application, and, as shown herein, a gear 36 is operatively connected to the driving mechanism (not shown) through a sprocket chain 38. The gear 36 is formed with a central hub 40 that is splined to the shaft 34 and is positioned between the bearings 30 and 32 within the housing of the power frame assembly 14. Also shown in the copending application is a hydraulic lift frame that is adapted to elevate the power frame assembly 14 together with the power shaft 34. However, for purposes of this invention, the hydraulic lift frame need only be mentioned as a means for providing for vertical lifting of the power shaft 34 and does not form a part of the present invention.

Referring again to FIG. 1, the power shaft 34, which is shown formed in a tubular construction, is adapted to receive a wheel assembly generally indicated at 42 on the outermost end thereof when the wheel assembly 42 is mounted in the demounting position thereof. Since the form of the invention illustrated in FIGS. 1 through 4 is adapted to be utilized with the disc type of wheel assembly, the wheel assembly 42 is shown including a central disc portion 43, a rim 44 and tire 45 mounted on the rim 44.

In order to mount the wheel assembly 42 in the demounting position thereof, a novel wheel retaining or receiving member is provided and is generally indicated in FIG. 4 at 46. The wheel receiving member 46 includes a central collar 47 to which a plurality of plates 48 are joined. The plates 48, which are generally triangular in configuration, are affixed to the collar 47 so that they extend somewhat beyond one edge thereof. The plates 48 are also disposed approximately 120 degrees from each other and are therefore equally spaced around the periphery of the collar 47. An interconnecting disc 49 is joined to the outermost ends of the plates 48 and has secured thereto and extending outwardly therefrom a plurality of triangularly shaped plates 50. The plates 50 are substantially coplanar with the plate 46 and have inclined flanges 52 secured to the outer ends thereof. As shown in FIG. 1, the wheel receiving member 46 is positioned on the power shaft 34 by affixing the collar 47 to the power shaft 34 in any convenient manner, such as by welding or the like. The outer end of the power shaft 34 extends substantially beyond the outermost end of the flanges 52, the space between the plates 50 being sufficient to provide for the extension of the power shaft 34 therethrough. The wheel assembly 42 is adapted to be mounted on the wheel receiving member 46 in a tire demounting position, and in this position the centrally disposed opening in the central disc portion 43 is received on the inclined flanges 52, the inclination of the flanges 52 automatically compensating for the size of the central opening in the wheel assembly mounted thereon.

In order to lock the wheel assembly 42 on the wheel receiving member 46, a locking assembly is provided and includes a locking member generally indicated at 54 in FIG. 3. The locking member 54 includes a central hub 56 which, as seen in FIG. 1, is adapted to slidably fit on the outermost end of the power shaft 34. Radially extending from the hub 56 are equally spaced spokes or arms 58 to which an annular ring member 60 is secured at the outermost ends thereof. The ring member 60 is adapted to engage the outer edges of the central disc portion 43 of the wheel assembly, and upon inner movement thereof locks the wheel assembly 42 in position on the wheel receiving member 46. In order to move the locking member 54 inwardly or to the right as seen in FIG. 1, the locking assembly further includes a novel adjusting device that includes a spindle 62. The spindle 62 extends through the hub 56 of the locking member 54 and into the tubular power shaft 34 in coaxial relation therewith. The outermost portion of the spindle 62 is formed in a solid construction; however, the innermost portion thereof is tubular in formation and is internally threaded to receive an externally threaded elongated actuating shaft 64. An opening is formed in the solid portion of the spindle 62 adjacent the outermost end thereof for receiving a pin 66 therein, the pin 66 being removably secured in the spindle 62 and being adapted to abut against the outermost end of the hub 56 of the locking member 54. Since the spindle 62 threadably engages the actuating shaft 64, the locking member 54 may be adjusted to effect a primary locking action of the wheel assembly by rotating the pin 66, which rotates the spindle 62. Rotation of the spindle 62 causes the inner threaded portion thereof to move to the right on the threaded shaft 64 as seen in FIG. 1, and the pin 66 is caused to engage the outermost end of the hub 56 of the locking member 54. Since the locking member 54 engages the wheel assembly 42, the movement of the pin 66 to the right against the hub 56 locks the wheel assembly on the wheel receiving member 46. Inasmuch as the aforesaid movement of the spindle 62 by rotation thereof by the locking pin 66 is performed manually, engagement of the locking member 54 with the wheel assembly 42 is not sufficiently effective to securely mount the wheel assembly 42 in the demounting position thereof. Accordingly, a further locking step is necessary in order to effect a final locking action. This locking step is carried out through a pressure responsive device that is generally indicated in FIG. 1 at 68. The pressure responsive device 68 includes a diaphragm housing defined by housing members 70 and 72 which are joined together at the peripheral flanges thereof by suitable bolts. Fixed between the flanges of the housing members 70 and 72 is a diaphragm 74 to which an enlarged end portion 75 of the actuating shaft 64 is joined by means of a flange 76. The diaphragm 74 is normally biased to the left as seen in FIG. 1 by a coil spring 80 which engages the diaphragm through a flange 82. The spring is disposed in a recess 84, the recess being formed in an embossment 86 that is integrally formed on the outer end of the housing member 72. Communicating with the interior of the housing member 70 is a passage 88 that is formed in an extension 89 of the housing 70 and in a collar 90 mounted on the shaft 34. Communicating with the passage 88 and extending upwardly therefrom is a conduit 92 on which is positioned a control valve 94 that is connected to a suitable source of a fluid medium. A handle 96 is mounted on the valve 94 and is readily accessible for controlling the flow of the fluid medium through the conduit 92.

In operation, the wheel assembly 42 is first lifted onto the platform 12, the inclined flanges 52 of the wheel receiving member 46 positioned for receiving the central opening in the wheel disc portion. The locking member 54 is then slipped on the power shaft 34 and the locking pin 66 inserted in place. The primary locking action is then effected by rotating the spindle 62. In order to effect the final locking action, the handle 96 is rotated to cause the fluid medium to be introduced into the housing member 70, the diaphragm 74 being flexed to the right against the action of the spring 80 and thereby causing the actuating rod or shaft 64 to move to the right as seen in FIG. 1. Movement of the shaft 64 to the right will cause the spindle 62 threadedly connected thereto to move to the right, carrying the pin 66 therewith. Since the pin 66 engages the outermost end of the hub 56 of the locking member 54, the pin will be caused to move into firm engagement with the hub 56 thereby firmly locking the wheel assembly 42 on the wheel retaining member 46. Once the wheel assembly 42 is locked into position by the pressure responsive device 68, the power shaft 34 and the wheel assembly 42 may be lifted to the demounting position thereof, together with the power frame assembly, the lifting actuation being carried out by the lift mechanism illustrated and described in the aforesaid copending application.

Referring now to FIGS. 5, 6 and 7, a modified form of the invention is illustrated and is adapted to be utilized in those cases wherein the central disc portion 43 is not incorporated in the wheel assembly 42. In wheel assemblies of this type, since the rim diameter is larger than the diameter of the disc 49, it would not be possible to mount the wheel assembly on the wheel retaining member 46. Accordingly, some form of an adapter must be provided in order to effectively mount the open rim type of wheel assemblies. As shown in FIG. 7, one form of an adapter is illustrated therein and is generally indicated at 98. The adapter 98 is formed of side plates 100 and 101 that are inter-connected by ribs 102 and 104 and a bottom wall 106. Formed in the uppermost ends of the side walls 100 and 101 are grooves 108 into which the flange of the rim of the wheel assembly is adapted to be seated. Grooves 110 are also formed in the upper edges of the walls 100 and 101 and are adapted to receive therein an elastic retaining band 112, the purpose of which will be described below. Since the wheel retaining member 46 includes the three equally spaced flanges 52, three of the adapter members 98 are provided and are mounted on the flanges 52 by inserting each of the flanges between the rib 104 and the bottom wall 106 of each adapter. As seen in FIG. 6, the inclined formation of the bottom wall 106 cooperates with the inclined flange 52 to cause the adapter 98 to be disposed in a generally upright position. The elastic band 112 is then inserted in the grooves 110 of the adapters 98 and biases the adapters against the locking member 54. Thus, when the locking member 54 is moved into engagement with the outer edges of the walls 100, 101, ribs 102, 104 and bottom wall 106 by rotation of the pin 66, together with the spindle 62, the adapters 98 will be forced into primary locking position by the cooperating action of the resilient band 112 and the locking member 54. Actuation of the pressure responsive diaphragm 74 by introduction of the fluid medium into the housing member 70 will cause the actuating shaft 64 to move the pin 66 firmly against the hub 56 of the locking member 54. The locking member 54 then cooperates with the resilient band 112 to retain the adapter 98 firmly on the wheel retaining member 46, thereby locking the wheel assembly in the demounting position thereof.

It is seen that the present invention enables any form of wheel assembly to be effectively locked in a demounting position for the removal of a tire therefrom. The pressure responsive device insures that the locking member 54 will effectively retain the wheel assembly in the demounting position thereof, and only upon release of the pressure fluid from the housing member 70 can the locking member 54 be released from engagement with the wheel assembly. Because of this positive type of locking arrangement, the wheel assembly will always be maintained in a firm locked position during the demounting of the tire therefrom. Since the wheel retaining member 46 includes the inclined flanges 52, various forms and sizes of wheel assemblies may be mounted in the demounting position. Furthermore, since the invention includes relatively few elements, any of the parts may be removed for cleaning or replacement as desired.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In apparatus for demounting a tire from a wheel assembly, a base, a power frame assembly mounted on said base and including a tubular elongated power shaft, a wheel receiving member fixed on said power shaft, a removable locking member including a central hub slidably mounted on the outer end of said power shaft and an annular ring that is adapted to engage said wheel assembly in the demounting position thereof, and means for moving said locking member into firm engagement with said wheel assembly to lock said wheel assembly in position for the demounting of the tire therefrom, said moving means including a tubular spindle extending interiorly of said locking member and tubular power shaft in coaxial relation ttherewith, said tubular spindle having a threaded portion formed therein, an actuating rod positioned coaxially within said tubular power shaft and threadably engaging the threaded portion of said tubular spindle, wherein said tubular spindle is initially adjusted on said actuating rod by rotation relative thereto, said spindle being longitudinally movable by said actuating rod to move said locking member into engagement with said wheel assembly, and means operatively engaging said actuating rod for imparting longitudinal movement thereto for effecting a firm locking action of said locking member on said wheel assembly.

2. In apparatus for demounting a tire from a wheel assembly, a platform for initially supporting said wheel assembly, a power frame assembly mounted on said platform and including a tubular elongated power shaft, a wheel receiving member fixed on said power shaft and including a plurality of spaced inclined flanges that generally define a cone configuration, said inclined flanges being adapted to accommodate various size wheel assemblies thereon, a locking member mounted on the outer end of said power shaft and engaging said wheel assembly in the demounting position thereof, an adapter mounted on each of said inclined plates for receiving a disc-less type of wheel assembly thereon, resilient means engaging said adapters and cooperating with said locking member for retaining said adapters on said inclined plates, and a pressure responsive locking assembly operatively engaging said locking member for forcing said locking member into contact with said wheel assembly, said wheel assembly thereby being mounted in firm engagement with said wheel receiving member.

3. In apparatus for demounting a tire from a wheel assembly, a base, a power frame assembly mounted on said base and including an elongated power shaft, a wheel receiving member fixed on said power shaft and including a plurality of spaced inclined plates joined to a central collar, said inclined plates generally defining a cone for receiving wheel assemblies of various sizes thereon and being spaced apart to define a central opening therebetween, a locking member for locking said wheel assembly on said wheel receiving member including a central hub slidably mounted on said shaft and extending into the central opening between said spaced inclined plates, an annular ring that is adapted to engage said wheel assembly in the demounting position thereof, means engaging said locking member, and pressure responsive means operatively engaging said engaging means for imparting longitudinal movement thereto thereby moving said annular ring into firm locking engagement with said wheel assembly, said engaging means including a tubular spindle extending into said power shaft and having a transversely extending pin secured therein adjacent the outer end thereof, an actuating rod threadably engaging said tubular spindle wherein said tubular spindle is initially adjusted with respect thereto by rotation of said pin, said tubular spindle being movable axially by said pressure responsive means to force said pin into engagement with said locking member, whereby said locking member is moved into firm engagement with said wheel assembly.

References Cited in the file of this patent

UNITED STATES PATENTS

| | | |
|---|---|---|
| 1,742,590 | Freivogel | Jan. 7, 1930 |
| 1,959,655 | Brouhard | May 22, 1934 |
| 2,057,200 | McCarthy | Oct. 13, 1936 |
| 2,065,644 | Bristol | Dec. 29, 1936 |
| 2,233,371 | Smith | Feb. 25, 1941 |
| 2,469,723 | Greene | May 10, 1949 |
| 2,530,572 | Eckles | Nov. 21, 1950 |
| 2,767,781 | Lewis et al. | Oct. 23, 1956 |
| 2,808,860 | Hildebrant | Oct. 8, 1957 |
| 2,906,322 | Lewis | Sept. 29, 1959 |